United States Patent [19]
Baker et al.

[11] Patent Number: 6,118,075
[45] Date of Patent: Sep. 12, 2000

[54] STACKABLE UNIVERSAL PITCH CABLE TROUGH SYSTEM

[75] Inventors: Frank Phillips Baker, Chatham; Golam Mabud Choudhury, Warren; Theodore Alan Conorich, Lake Hiawatha; Wayne Scott Filus, Lebanon, all of N.J.

[73] Assignee: Lucent Technologies Inc., Murray Hill, N.J.

[21] Appl. No.: 09/251,442

[22] Filed: Feb. 17, 1999

[51] Int. Cl.⁷ ...................................................... H01B 3/00
[52] U.S. Cl. ............................. 174/72 A; 174/95; 174/97; 174/100; 52/712; 361/826
[58] Field of Search .................................. 174/68.1, 68.2, 174/68.3, 100, 72 R, 72 A, 135, 95, 97, 99 R, 50, 48; 220/3.2, 4.02; 52/39, 712; 248/49; 138/112; 361/826

[56] References Cited

U.S. PATENT DOCUMENTS

| | | |
|---|---|---|
| D. 387,652 | 12/1997 | Carlson, Jr. . |
| D. 388,400 | 12/1997 | Rogers . |
| 1,590,569 | 6/1926 | Fisk ............................................ 439/17 |
| 2,137,536 | 11/1938 | McConnell ............................ 174/72 C |
| 2,896,009 | 7/1959 | Caveney ................................ 174/72 A |
| 3,494,657 | 2/1970 | Tantlinger et al. ...................... 296/208 |
| 4,320,261 | 3/1982 | Scerbo et al. . |
| 4,563,050 | 1/1986 | Greenwood et al. . |
| 4,629,826 | 12/1986 | Thomas .................................. 174/99 R |
| 4,866,215 | 9/1989 | Muller et al. . |
| 5,067,678 | 11/1991 | Henneberger et al. . |
| 5,240,209 | 8/1993 | Kutsch .................................. 174/72 A |
| 5,277,006 | 1/1994 | Ruster . |
| 5,306,870 | 4/1994 | Abat ...................................... 174/65 R |
| 5,336,097 | 8/1994 | Williamson, Jr. et al. . |
| 5,359,143 | 10/1994 | Simon ...................................... 174/101 |
| 5,546,495 | 8/1996 | Bruckner et al. . |
| 5,615,682 | 4/1997 | Statz, Sr. . |
| 5,639,261 | 6/1997 | Rutkowski et al. . |
| 5,655,738 | 8/1997 | Ragsdale et al. . |
| 5,700,167 | 12/1997 | Pharney et al. . |
| 5,718,604 | 2/1998 | Conorich et al. . |
| 5,730,400 | 3/1998 | Rinderer et al. . |
| 5,731,546 | 3/1998 | Miles et al. . |
| 5,740,300 | 4/1998 | Hodge . |
| 5,804,765 | 9/1998 | Siemon et al. . |
| 6,011,221 | 1/2000 | Lecinski et al. ...................... 174/72 A |

Primary Examiner—Kristine Kincaid
Assistant Examiner—Dhiru R Patel
Attorney, Agent, or Firm—Dickstein Shapiro Morin & Oshinsky LLP

[57] ABSTRACT

A universal panel for receiving cabling components is disclosed. The panel includes a plurality of panel segments that are interconnected to form panel modules. The panel modules are interconnected to provide a panel of any desired length, extending from the floor to the ceiling if desired. A panel segment includes a first alignment feature and a second alignment feature. The first and second alignment features are disposed to engage a second alignment feature and a first alignment feature, respectively, on a second panel segment to form a panel module. Each panel module includes a coupler and a receiver. The coupler of one panel segment is disposed to engage the receiver of the other panel segment. Each of the panel segments further includes a first alignment feature and a second alignment feature. The first alignment feature of one panel segment is disposed to engage the second alignment feature of the other panel segment. According to one aspect of the invention, the plurality of interconnected panel segments are identical.

39 Claims, 14 Drawing Sheets

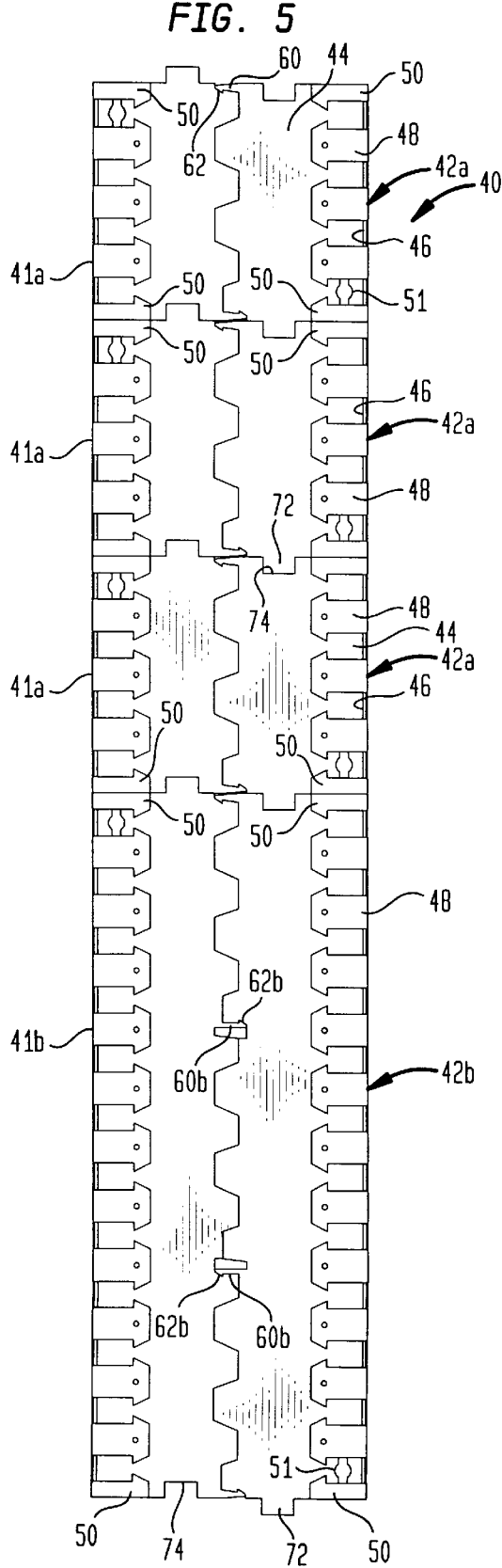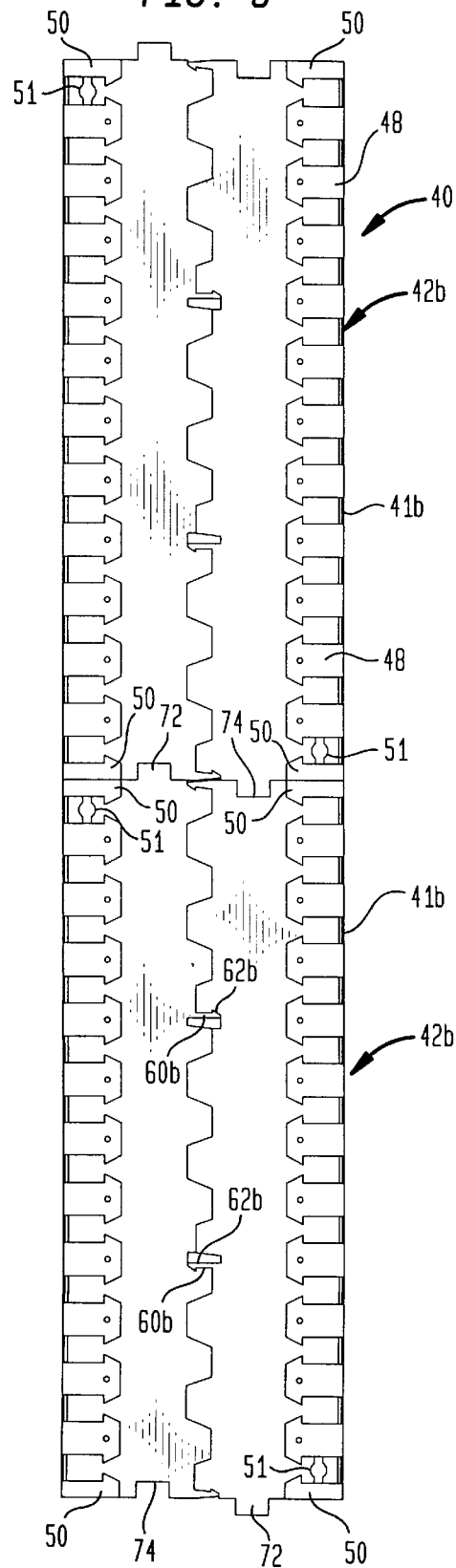

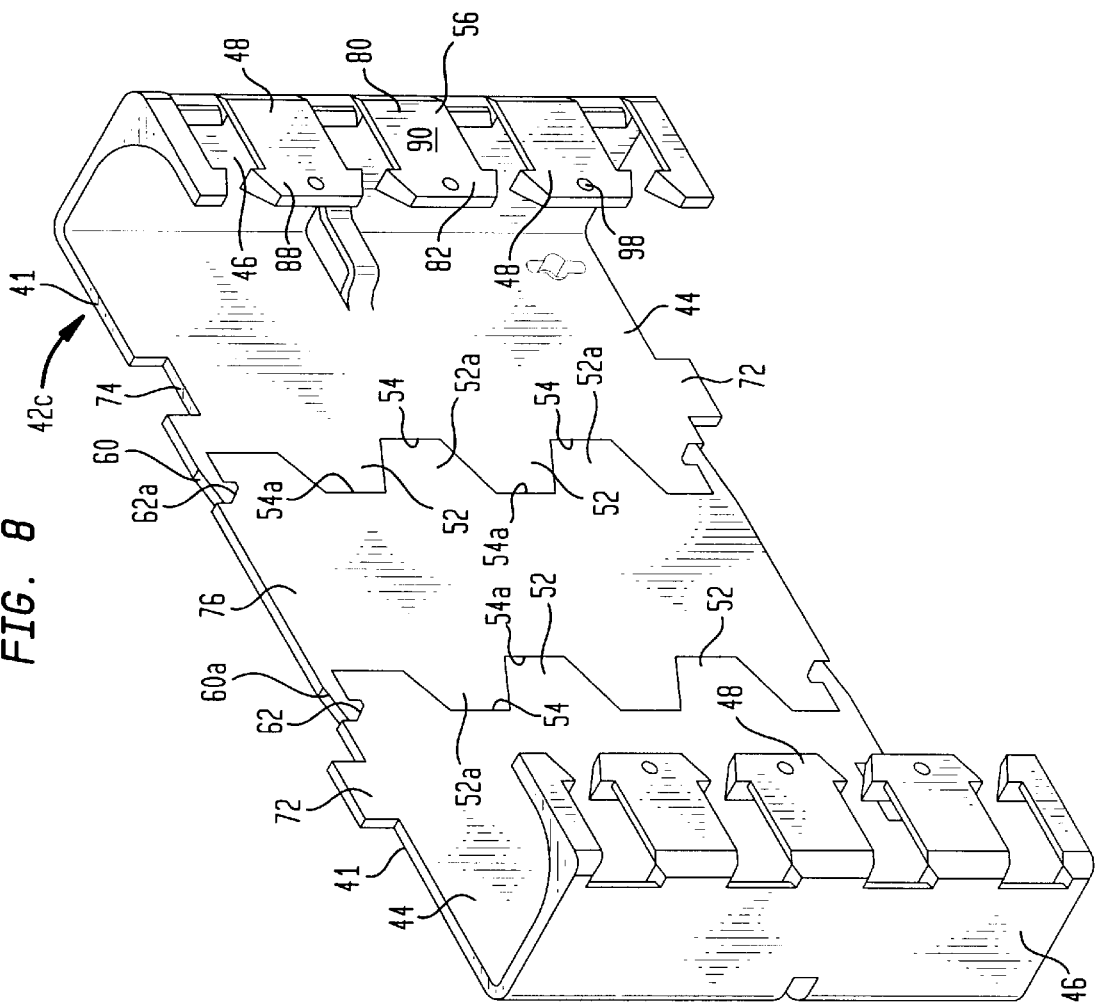
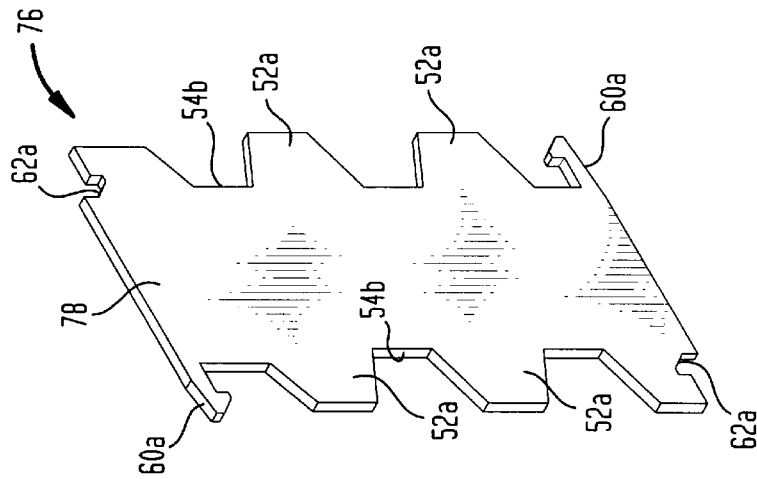

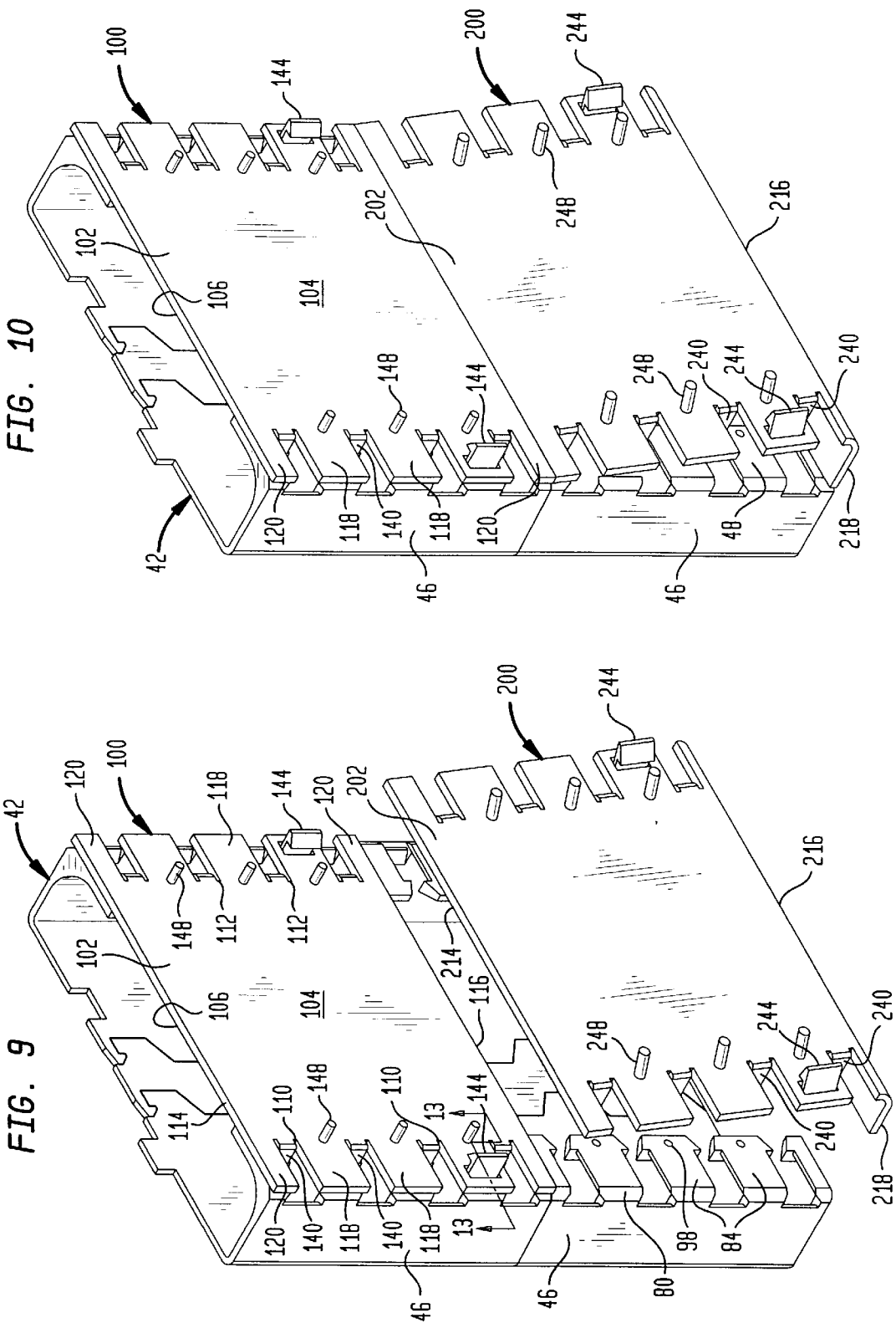

STACKABLE UNIVERSAL PITCH CABLE TROUGH SYSTEM

BACKGROUND OF THE INVENTION

1. Field of the Invention

The present invention relates to cable management systems and particularly to telephone cable management systems using a wall or frame-mounted panel, and wiring blocks and troughs coupled to the panel. More particularly, it relates to a universal panel using a plurality of panel segments that are combined to form panel modules. The individual panel modules are then combined to form a cabling panel.

2. Description of the Related Art

As illustrated in FIGS. 1 and 2, conventional telephone cable management systems include a metal panel 10 defining a channel 11 attached to a wall. The panel 10 includes a base wall 12, a pair of side walls 14 extending from the base wall 12, and a plurality of tabs 16 extending inwardly from the side walls 14. The tabs 16 include trough tabs 16a and wiring block tabs 16b alternating along the length of the panel 10. A plurality of wiring blocks 20 and troughs 22 are alternately attached to the tabs 16b and 16a, respectively, and a duct assembly 24 is attached to the bottom of the panel 10.

As illustrated in FIG. 2, a wiring bundle 30 is routed in the channel 11 behind the wiring blocks 20 and troughs 22. Patch cords 26 are coupled to the wiring blocks 20 and run through the troughs 22 to wire rings 32, and then routed down to the duct assembly 24 for further routing as necessary.

The conventional cable management system has worked well in the past, but it has several disadvantages. First, the alternating trough tabs 16a and wiring block tabs 16b limit the utility of the panel to a single configuration of alternating troughs and wiring blocks. Second, the panel is only available in two sizes, i.e., a 300 wire pair size and a 900 wire pair size. A third disadvantage arises with the advent of new high bit rate data type cables that have been increasing in diameter. The increased diameter has decreased the available free space in the channel 11 behind the wiring blocks 20 and troughs 22.

SUMMARY OF THE INVENTION

The present invention overcomes the above cited disadvantages of conventional cable management systems and provides additional advantages by providing a universal panel for receiving cabling components. The panel includes a plurality of panel segments that are interconnected to form panel modules. The panel modules are interconnected to provide a panel of any desired length, extending from the floor to the ceiling if desired.

According to the present invention, a panel segment comprises a base wall having a first alignment feature and a second alignment feature, a sidewall extending from the base wall, and a plurality of tabs extending from the sidewall. The first and second alignment features are disposed to engage a second alignment feature and a first alignment feature, respectively, on a second, identical panel segment to form a panel module. Each of the plurality of tabs includes a proximal end attached to the sidewall and a distal end, and a trapezoidal shaped engaging portion attached to the distal end. The engaging portion includes an alignment aperture.

The invention further includes a plurality of interconnected panel modules. Each panel module includes a plurality of interconnected panel segments. Each panel module includes a first panel segment and a second panel segment and each of the first and second panel segments includes a coupler and a receiver. The coupler of the first panel segment is disposed to engage the receiver of the second panel segment. Each of the first and second panel segments further includes a first alignment feature and a second alignment feature. The first alignment feature of the first panel segment is disposed to engage the second alignment feature of the second panel segment. According to one aspect of the invention, the plurality of interconnected panel segments are identical.

A spacer may also be provided between a first panel segment and a second panel segment, with the two panel segments and spacer forming a panel module. Each of the first and second panel segments includes a first alignment feature and a second alignment feature. The spacer includes a first side and a second side, with each side including a first alignment feature and a second alignment feature. The first alignment feature on the first side of the spacer engages the second alignment feature on the first panel segment and the second alignment feature on the first side engages the first alignment feature formed on the first panel segment for engaging with complicating features on the first and second panel segments.

These and other features and advantages of the invention will become more readily apparent from the following detailed description of a preferred embodiment of the present invention which is provided in connection with the accompanying drawings.

BRIEF DESCRIPTION OF THE DRAWINGS

FIG. 5 is a plan view of a panel comprised of three 100-pair panel modules stacked above a 300-pair panel module.

FIG. 6 is a plan view of a panel comprised of two stacked 300-pair panel modules.

FIG. 7 is a perspective view of a spacer.

FIG. 8 is a perspective view of a panel module having the spacer of FIG. 7 disposed between two panel segments.

FIG. 9 is a perspective view illustrating a first embodiment of a flat adapter plate coupled to a panel and a second embodiment in position to be coupled to the panel.

FIG. 10 is a perspective similar to FIG. 9 illustrating the second embodiment of the adapter plate coupled to the panel.

DETAILED DESCRIPTION OF PREFERRED EMBODIMENTS

Figure 1:
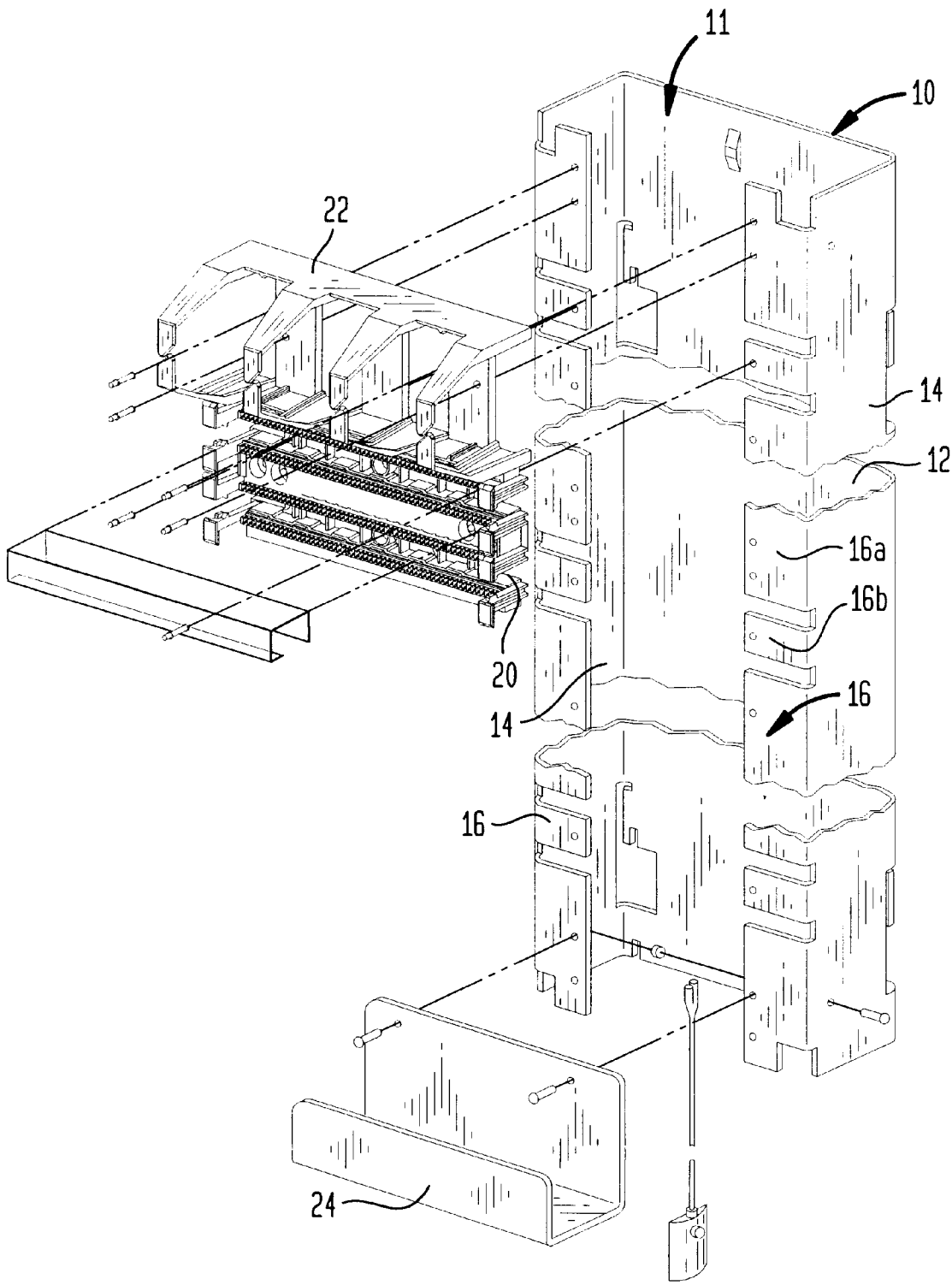
FIG. 1 is an exploded perspective view of a portion of a conventional cable management system.
Figure 2:
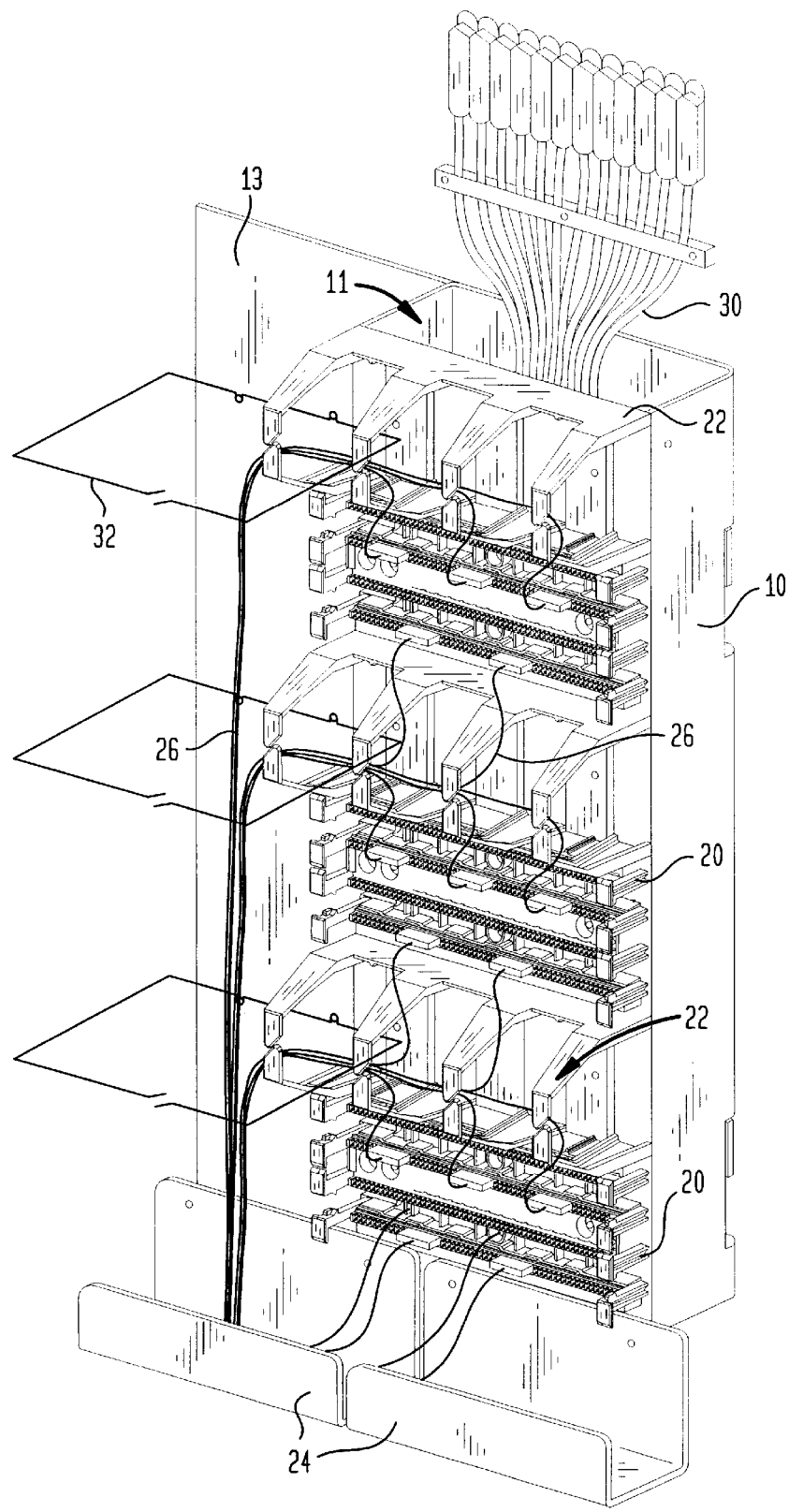
FIG. 2 is a perspective view of an assembled conventional cable management system.
Figure 4:
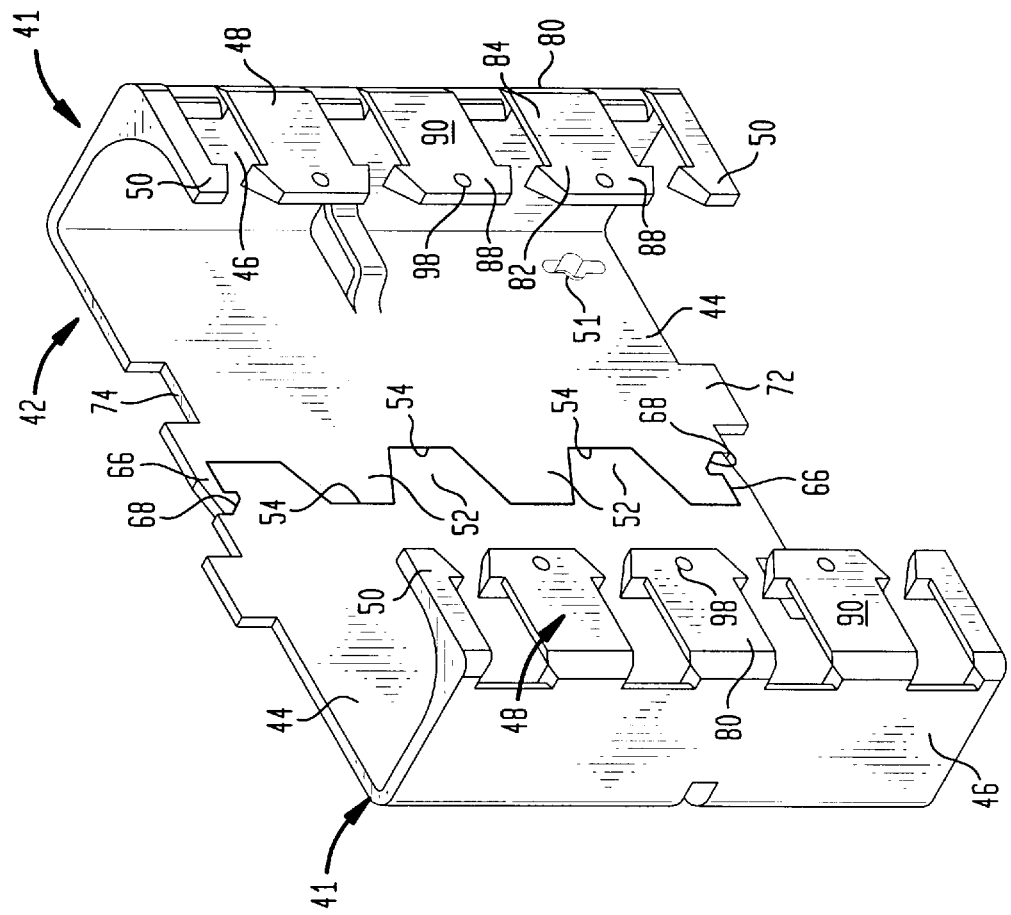
FIG. 4 is a perspective view of a panel module assembled by joining two panel segments.
Figure 3:
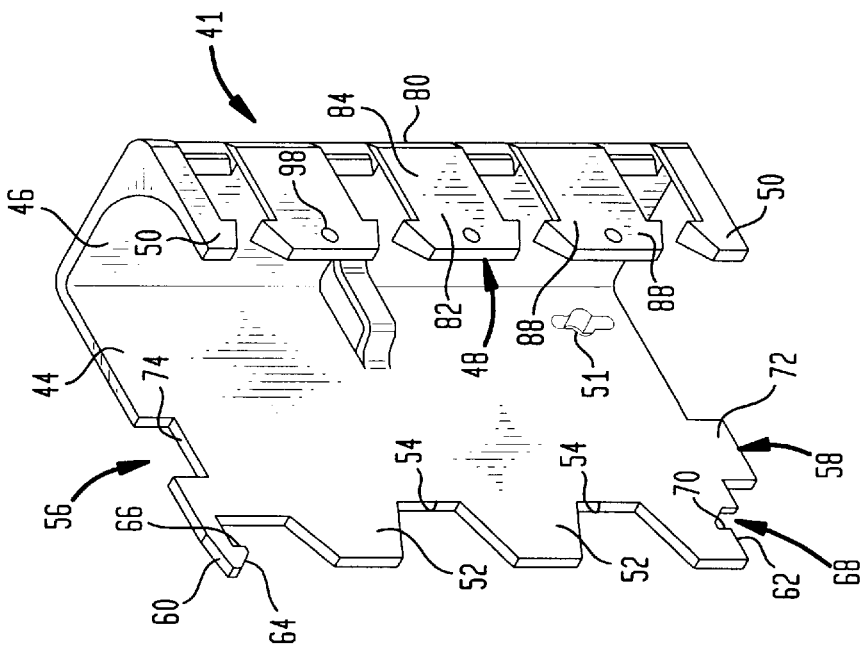
FIG. 3 is a perspective view of a panel segment according to the invention.

A panel according to the present invention is illustrated in FIGS. 3–8. The panel 40 includes a plurality of panel segments 41 (FIG. 3) that are interconnected to form a panel module 42 (FIG. 4). In preferred embodiments, the panel segments 41 are identical and reversible, so that two panel segments 41 can be arranged to face each other and be joined together, as illustrated in FIGS. 4–6. The panel modules 42 are interconnected to provide a panel 40 of any desired length, extending from the floor to ceiling if desired. As illustrated in FIGS. 5–6, the panel modules 42 can vary in length. In particular, FIG. 5 illustrates three 100-pair modules 42a designed to accommodate 100-pair cabling blocks stacked on top of a 300-pair module 42b designed to accommodate three 100-pair cabling blocks. FIG. 6 illustrates two stacked 300-pair modules 42b. The 100 pair module 42 length is approximated one third (⅓) as long as the 300 pair module 42b length. Thus, with only two sizes of panel segments 41a, 41b in inventory, a craftsperson can produce a wide array of panel configurations, overcoming a serious limitation of conventional panels. Each panel segment 41 includes a base wall 44 and a side wall 46 extending orthogonally from the base wall 44. A plurality of generally arrow-shaped tabs 48 extend inwardly from the side wall 46. Each panel segment 41 further includes half tabs 50 formed at the upper and lower ends of the panel segment 41. When two or more panel modules 42 are assembled to form a panel 40, as illustrated in FIG. 5, the half tabs 50 on one module 42 cooperate with the half tabs 50 on the adjacent module 42 to define full width tabs at the interface of the two modules 42, 42. Thus, a panel 40 includes multiple modules 42 but presents a continuous series of evenly spaced, equally sized tabs.

Each panel segment 41 further includes a fastener-receiving aperture 51, for attaching the panel segment 41 to a wall, a plurality of alternating first alignment features 52, and a plurality of second alignment features 54. In a preferred embodiment, the first and second alignment features 52, 54 are generally trapezoidal in shape, with the first aligned features 52 being trapezoidal projections extending from the base wall 44 and the second aligned features 54 being trapezoidal recesses formed in the base wall 44. The first and second alignment features 52, 54 are designed to be complementary. Thus, when two panel segments 41 are arranged in a face-to-face relation to be joined, the first features 52 on each segment 41 engage the second features 54 on the other, as illustrated in FIGS. 4–6.

Each panel segment 41 further includes a coupler 60 formed at the top of the segment 41 and a complementary receiver 62 formed at the bottom of the segment 41. In a preferred embodiment, the coupler 60 includes a generally arrow-shaped latch 64 extending from the base wall 44 and including an engaging surface 66. The receiver 62 includes a recess 68 configured to receive the latch 64. The recess 68 includes an engaging surface 70 disposed to engage with the latch engaging surface 66. Thus, when two panel segments 41 are joined together, the latch 66 of each segment 41 engages the recess 68 of the other segment 41 to retain them in position to form a module 42 as illustrated in FIGS. 4–6.

One end of each segment 41 includes a third alignment feature 56 and the other end of each segment 41 includes a fourth alignment feature 58 that is complementary to the third alignment feature 56. In a preferred embodiment, the fourth alignment feature 58 is a rectangular tab 72 and the third alignment feature 56 is a rectangular notch 74 configured to receive a tab 72, as illustrated in FIGS. 5–6. Thus, when two or more modules 42 are stacked together, the tab 72 of one module 42 engages the notch 74 of the adjacent module 42.

The panel module 42a, illustrated in FIGS. 4–5, includes two panel segments 41a and is sized to accommodate a 100-pair wiring block. The panel module 42b, illustrated in FIGS. 5–6, includes two panel segments 41b and is sized to accommodate three 100-pair wiring blocks. Accordingly, the module 42b is longer than module 42a. Additional couplers 60b and receivers 62b are provided along the length of each panel segment to improve the interlocking capability of the panel segments that form the module 42b. In a preferred embodiment, the couplers 60b and receivers 62b are identical to couplers 60 and receivers 62, respectively.

In order to provide a wider panel 40 to accommodate the new high bit rate data type cables, the panel module 42 can include a spacer 76, illustrated in FIGS. 7–8. The spacer 76 includes a plate 78 having first and second alignment features 52a, 54a disposed along both side edges of the spacer 76. The alignment features 52a, 54a are identical to the first and second alignment features 52, 54 formed on the panel segments 41. The first alignment features 52a on the spacer 76 are disposed to engage the second alignment features 54 on a segment 41, and the second alignment features 54a on the spacer 76 are disposed to engage the first alignment features 52 formed on a segment 41.

The spacer 76 further includes a coupler 60a and a receiver 62a formed on the top and bottom, respectively, of the spacer 76. The coupler 60a and receiver 62a are identical to the coupler 60 and receiver 62 formed on the panel segments. Thus, as illustrated in FIG. 8, two panel segments 41 can be aligned with, and coupled to, a spacer 76 to form a wider panel module 42c in the same manner as they would be coupled together to form a module 42.

The arrow-shaped tabs 48 include a proximal end 80 attached to the side wall 46, a distal end 82, an arm 56 extending between the proximal and distal ends 80, 82, respectively, and a trapezoidal engagement portion 88 attached to the distal end 82. The arrow-shaped tabs 48 further include a top surface 90 and a pair of beveled side surfaces 92 (FIG. 19) that extend downwardly and inwardly from the top surface 90.

Figure 13:
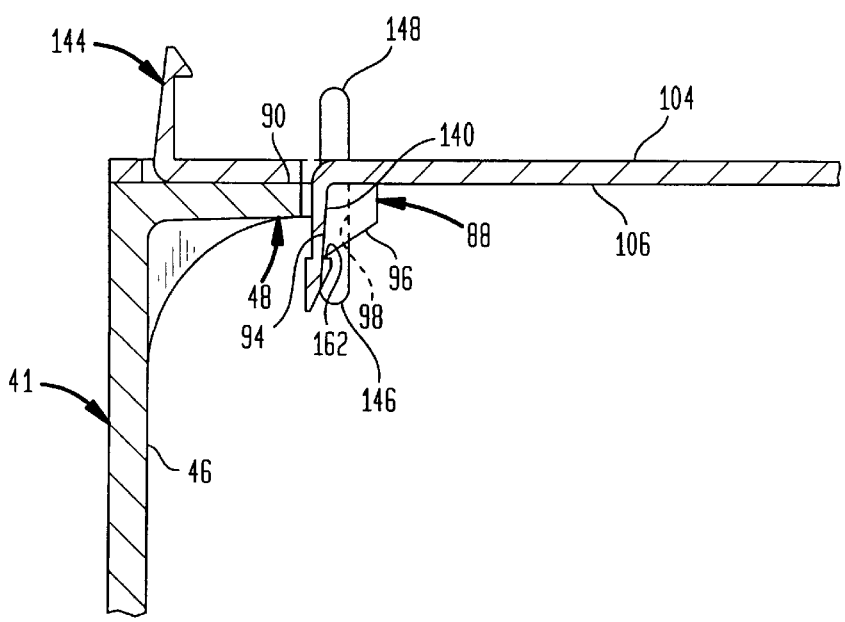
FIG. 13 is a partial section view taken along lines 13—13 in FIG. 9 illustrating an adapter plate coupled to tabs formed on the panel.

The trapezoidal engagement portion 88 includes a first engagement surface 94 and a second engagement surface 96, as best seen in FIG. 13 The first engagement surface 94 depends downwardly from the top surface 90 and is disposed in a facing relationship with the side wall 46. The second engagement surface 96 extends upwardly from the bottom of the first engagement surface 94 at an acute angle. An alignment aperture 98 is centrally disposed in the trapezoidal engagement portion 88. Cabling components, such as troughs or wiring blocks, can be attached directly to the panel 40. Preferably, however, an adapter plate, illustrated in FIGS. 9-10 and 14-20, is mounted to the panel 40 and includes structures for coupling the cabling component to the adapter plate and for coupling the adapter plate to the panel 40.

FIGS. 9 and 10 illustrate first and second embodiments of the adapter plate 100, 200, respectively. The adapter plate 100 includes a generally rectangular base member 102 having an upper surface 104, a lower surface 106, side edges 110,112, and top and bottom edges 114, 116, respectively. A plurality of abutment portions 118, 120 extend 10 from the side edges 110, 112. Abutment portions 120 are formed at each of the top and bottom edges 114, 116 and are substantially half as wide as the abutment portions 118. Thus, when two adapter plates 100 are disposed adjacent each other on the panel 40, or when one adapter plate 100 and one adapter plate 200 are disposed adjacent to each other as illustrated in FIG. 9, the abutment portions 120 of one of the adapter plates 100 cooperate with the abutment portions 120 of the other adapter plate 100, 200 to effectively provide a single abutment portion having a width equal to that of abutment portions 118. The abutment portions 118, 120 are spaced-apart and disposed to align with, and abut, the arrow-shaped tabs 48 on the panel 40.

Figure 11:
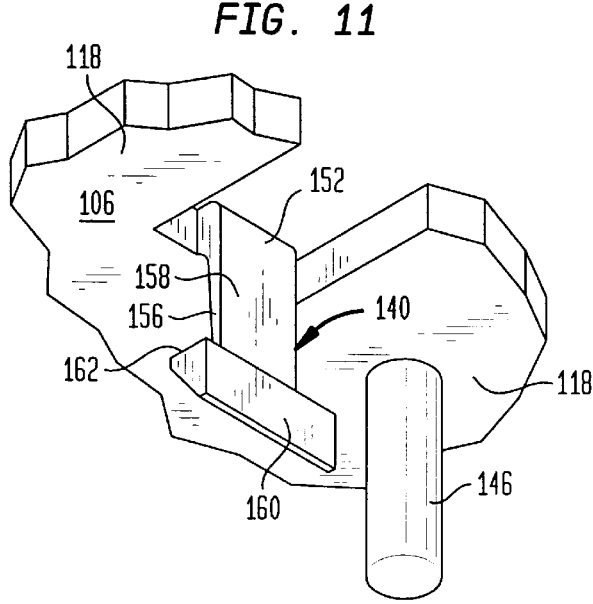
FIG. 11 is a perspective view illustrating a lower alignment pin and a lower fastener for aligning and retaining an adapter plate on a panel.

The adapter plate 100 further includes a plurality of lower fasteners 140, a plurality of upper fasteners 144, a plurality of lower alignment pins 146 (FIG. 11, 12) and a plurality of upper alignment pins 148. The lower fasteners 140, illustrated in FIG. 11, are disposed between the abutment portions 118 and extend orthogonally from the lower surface 106. Each lower fastener 140 includes a proximal end 152 attached to the base member 102, a distal end 156, an arm 158 extending between the proximal end 152 and the distal end 156, and an engagement portion 160 attached to the distal end 156. The engagement portion 160 has a triangular cross section and extends beyond the lateral edges of the arm 158. The engagement portion 160 further includes an engagement surface 162 configured to abut engagement surface 96 of the arrow-shaped tabs 48, as illustrated in FIG. 13. The plurality of lower alignment pins 146 extend downwardly from the lower surface 106 and generally parallel to and spaced-apart from the lower fasteners 140. The lower alignment pins 146 are positioned to engage alignment apertures 98 formed in the arrow-shaped tabs 48 when the adapter plate 100 is attached to the panel 40.

Figure 12:
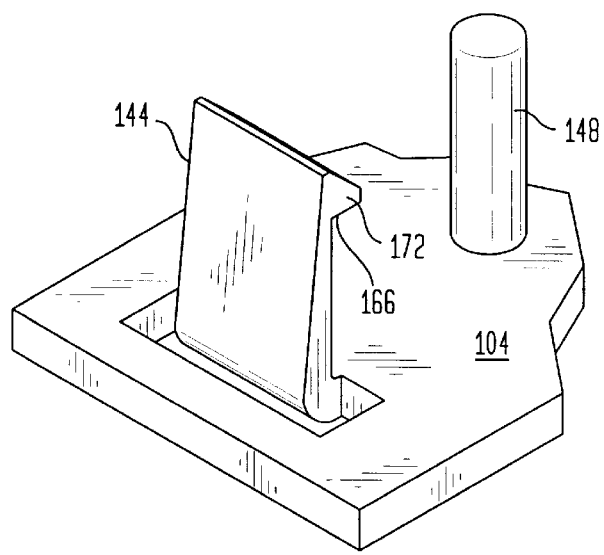
FIG. 12 is a perspective view of an upper alignment pin and an upper fastener for aligning and retaining a wiring block or trough on the adapter plate.

The upper fasteners 144, illustrated in FIG. 12, extend upwardly from the upper surface 104 to a triangular engaging portion 172. The triangular engaging portion 172 includes an engagement surface 166 configured to engage with and hold a conventional wiring block. The upper fasteners 144 are spaced apart in a predetermined position relative to the upper alignment pins 148. The plurality of upper alignment pins 148 extend upwardly from the upper surface 106 and are disposed in a predetermined relation to the upper fasteners 144, as illustrated in FIG. 12, to engage complementary alignment apertures formed in conventional wiring blocks or troughs (FIG. 15 fastener 482) for alignment and retention of the wiring blocks or troughs on the adapter plate 100.

The second embodiment of the adapter plate 200 (FIG. 9) includes a base member 202 and an abutment flange 218 that extends downwardly from the base member 202 to abut the panel 40. The abutment flange 218 positions the bottom edge 216 of the adapter plate 200 away from the panel 40 to align the adapter plate 200 at an angle relative to the panel 40. In order to retain the adapter plate 200 on the panel 40, lower fasteners 240 get progressively longer from the top edge 214 to the bottom edge 216 in order to accommodate the increasing distance between the adapter plate 200 and the panel 40. In addition, the lower fasteners 240 extend from the base member 202 at an angle equal to the angle between the adapter plate 200 and the panel 40. Preferably, the adapter plate 200 further includes at least one pair of lower alignment pins (not shown) to engage the apertures 98. In all other respects, such as lower and upper fasteners 240, 244, respectively, and upper alignment pins 248, the adapter plate 200 is the same as adapter plate 100. Advantageously, the adapter plate 200 is oriented at a more convenient angle for a craftsperson, facilitating access to wiring blocks and troughs coupled to the adapter plate 200 when the adapter plate 200 is at the top or bottom of the panel 40.

Figure 14:
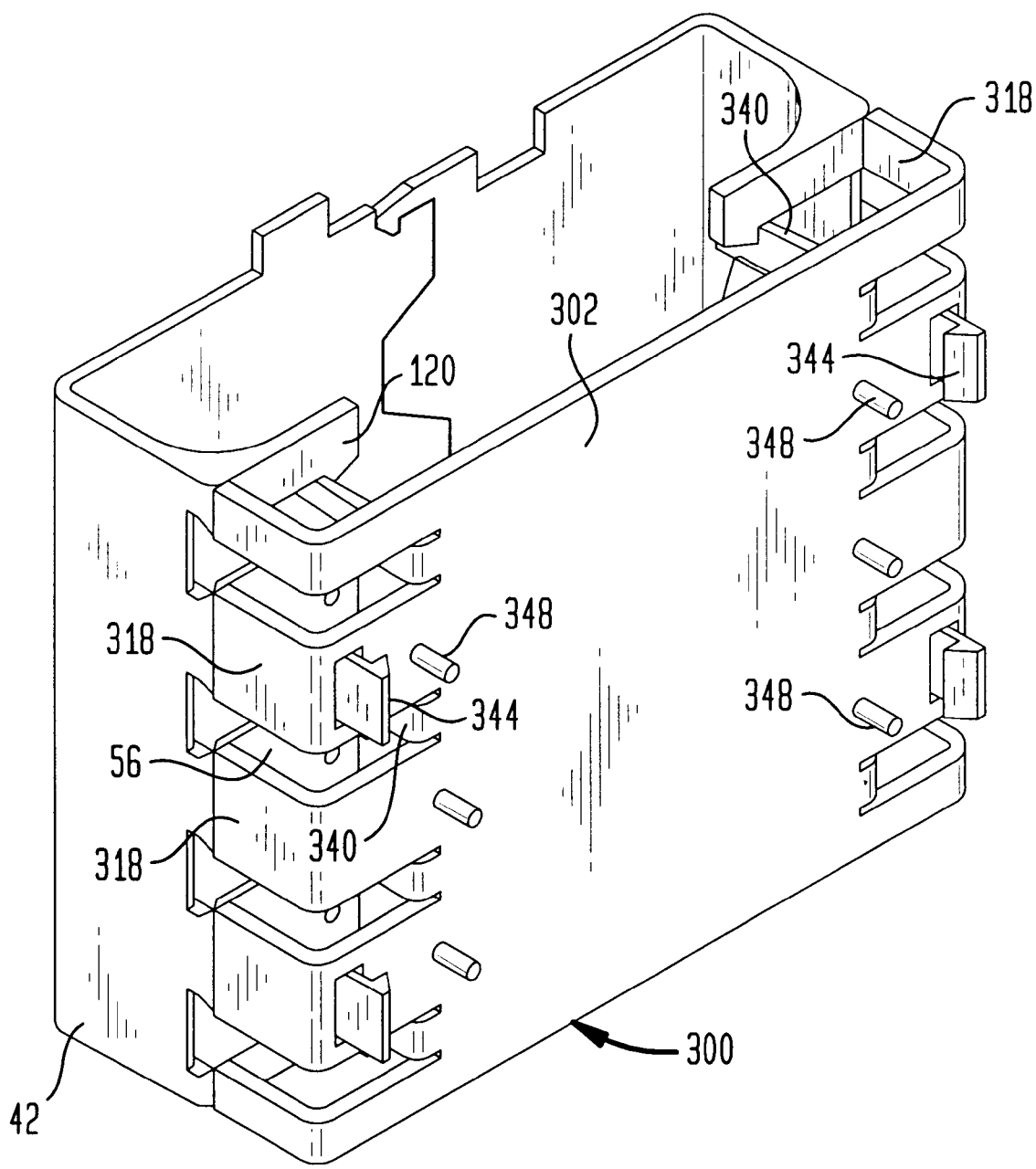
FIG. 14 is a perspective view illustrating a third embodiment of the adapter plate.

FIG. 14 illustrates a third embodiment of the adapter plate 300. The adapter plate 300 includes upper fasteners 344 and upper alignment pins 348, that are the same as upper fasteners 144 and upper alignment pins 148, extending from the base member 302. In addition, the adapter plate 300 includes abutment fingers 318 extending downwardly from the ends of the base member 302 to raise the adapter plate 300 away from the panel 40. Of course, lower fasteners 340 are necessarily longer than lower fasteners 140 to accommodate the increased distance between the base member 302 and the panel 40. Advantageously, the adapter plate 300 provides additional depth to the panel 40 to accommodate the larger high bit rate data type cables.

Figure 15:
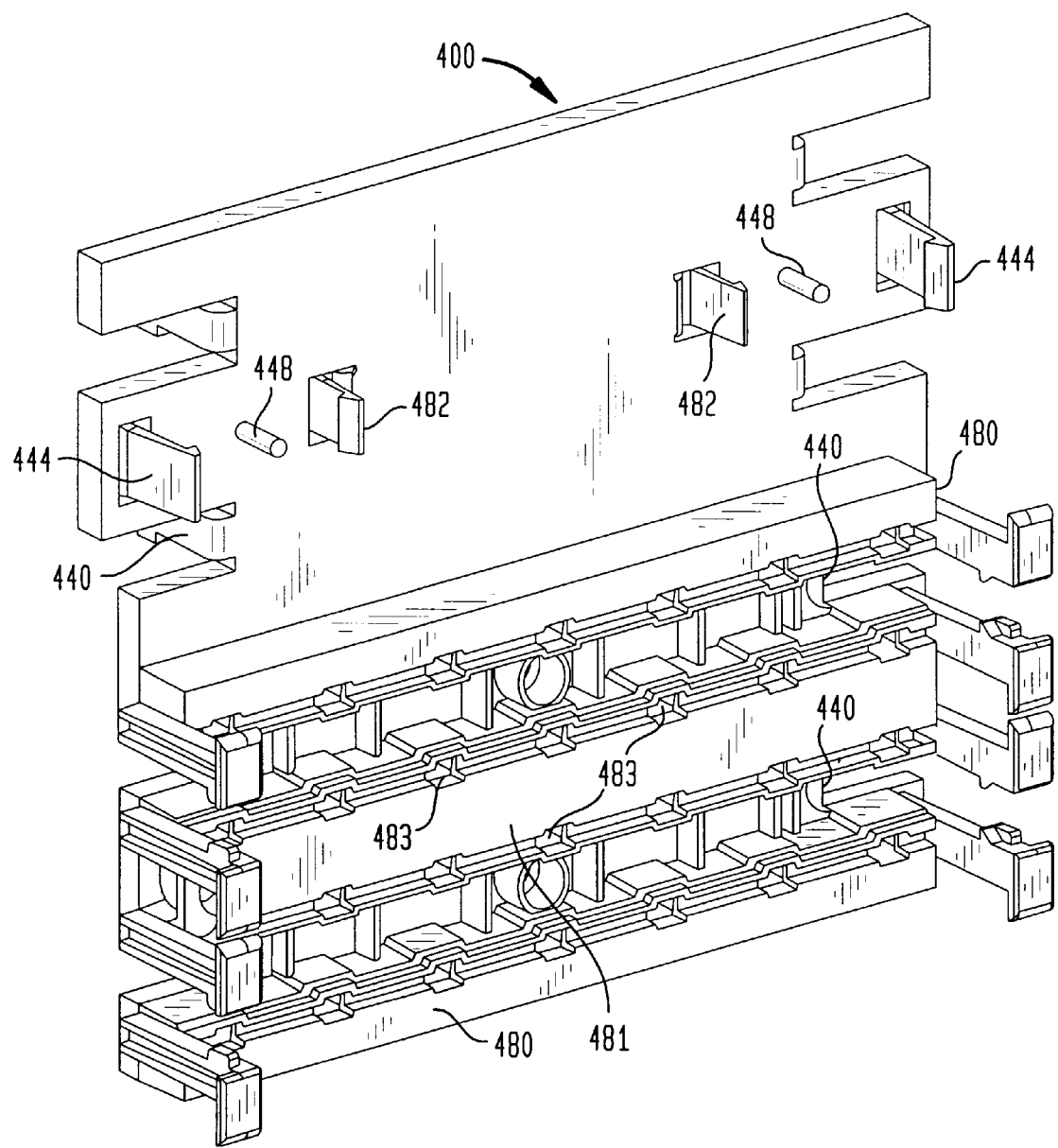
FIG. 15 is a perspective view illustrating a fourth embodiment of the adapter plate having an integrally molded wiring block.

FIG. 15 illustrates a fourth embodiment 400 of the adapter plate that includes a plurality of lower fasteners 440, a pair of upper fasteners 444, a plurality of upper alignment pins 448, and a plurality of integrally molded wiring blocks 480. In addition, adapter plate 400 includes a pair of inner upper fasteners 482 that are smaller versions of upper fasteners 444, with the inner upper fasteners 482 and upper fasteners 444 being disposed in a facing relationship. The upper alignment pins 448 and the inner upper fasteners 482 cooperate to align and retain a cabling component such as trough 586, shown in FIG. 16 in connection with another embodiment of the adapter plate.

Figure 16:
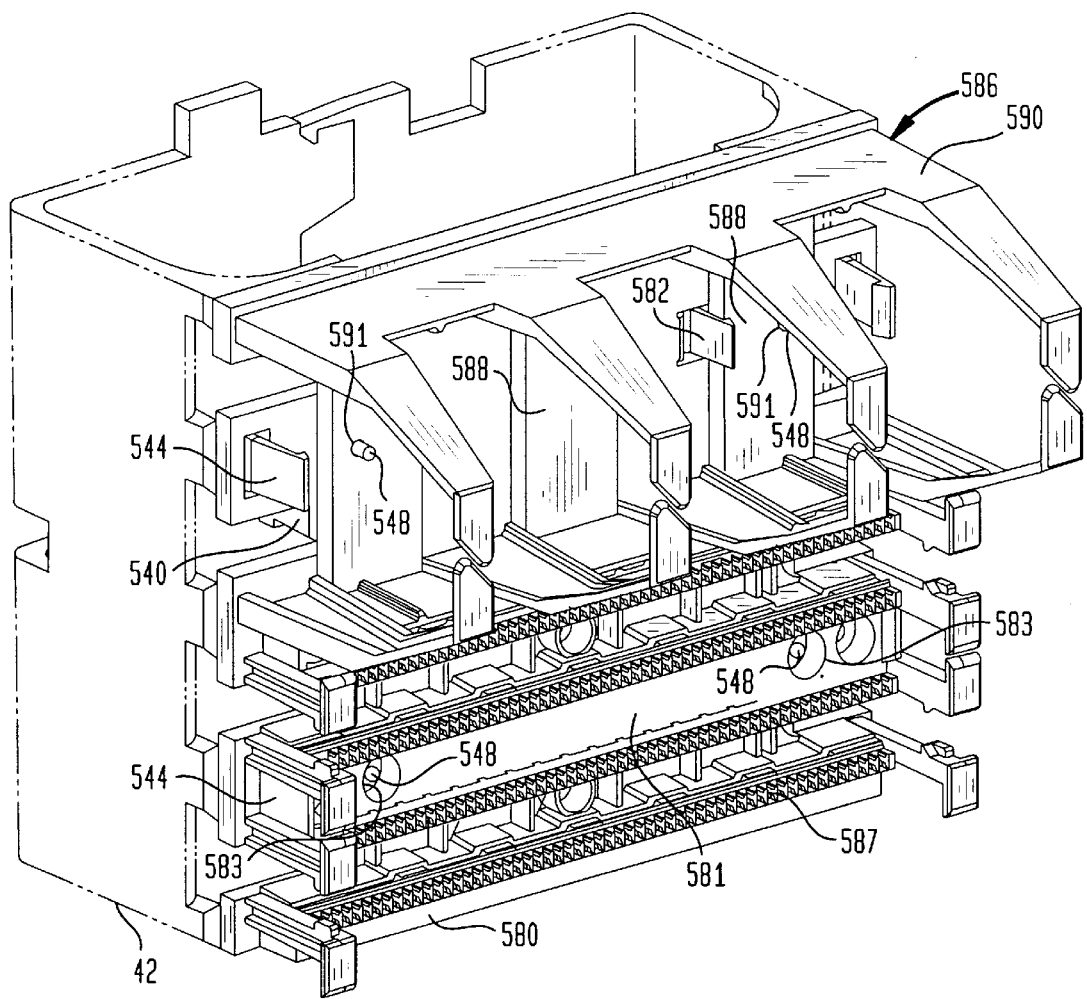
FIG. 16 is a perspective view of a fifth embodiment of the adapter plate coupled to a panel with a trough and one 100 pair wiring block coupled to the adapter plate.

The integrally molded wiring blocks 480 have a conventional configuration, including a ledge 481 and alignment and latch receiving apertures 483 (FIG. 15) and are configured to receive conventional, so called, 110-type index strips 587 (FIG. 16). In a non-integrally molded wiring block 580, as illustrated in FIG. 16, a ledge 581 engages upper fasteners, such as upper fasteners 144, 244, 344 to retain the wiring block 580 on the adapter plate, and the alignment apertures 583 receive upper alignment pins, such as upper alignment pins 148, 248, 348, 448 to align the wiring block with the adapter plate.

Still referring to FIG. 16, a fifth embodiment adapter plate 500 is attached to a panel 40, and includes lower fasteners 540, upper fasteners 544, upper alignment pins 548 and upper inner fasteners 582. Conventional wiring blocks 580 and a conventional wiring trough 586 are attached to the adapter plate 500. The trough 586 includes a plurality of vertical support members 588 attached to, and separating, a pair of finger plates 590. As illustrated, upper alignment pins 548 extend through apertures 591 formed in the vertical support members 588 and inner upper fasteners 582 engage vertical support members 588 to align and retain the trough 586 on the adapter plate 500. Upper alignment pins 548 engage alignment apertures 583 formed in the wiring block 580, and upper fasteners 544 engage ledge 581 to align and retain the wiring block 580 on the adapter plate 500. A plurality of conventional 110-type index strips 587 are shown as installed in the wiring blocks 580.

Advantageously, the present invention makes use of existing apertures 583 formed in conventional wiring blocks to align the wiring block with the adapter plate and uses the existing ledge 581 to engage the upper fasteners to retain the wiring block on the adapter plate. Likewise, the inner upper fasteners 582 cooperate to engage existing vertical support members of conventional troughs to retain the troughs on the adapter plate and the upper alignment pins engage existing apertures formed in the vertical support members to align the trough with the adapter plate. Accordingly, the present invention can use existing conventional troughs and wiring blocks without making any modifications to the wiring blocks or troughs.

Figure 17:
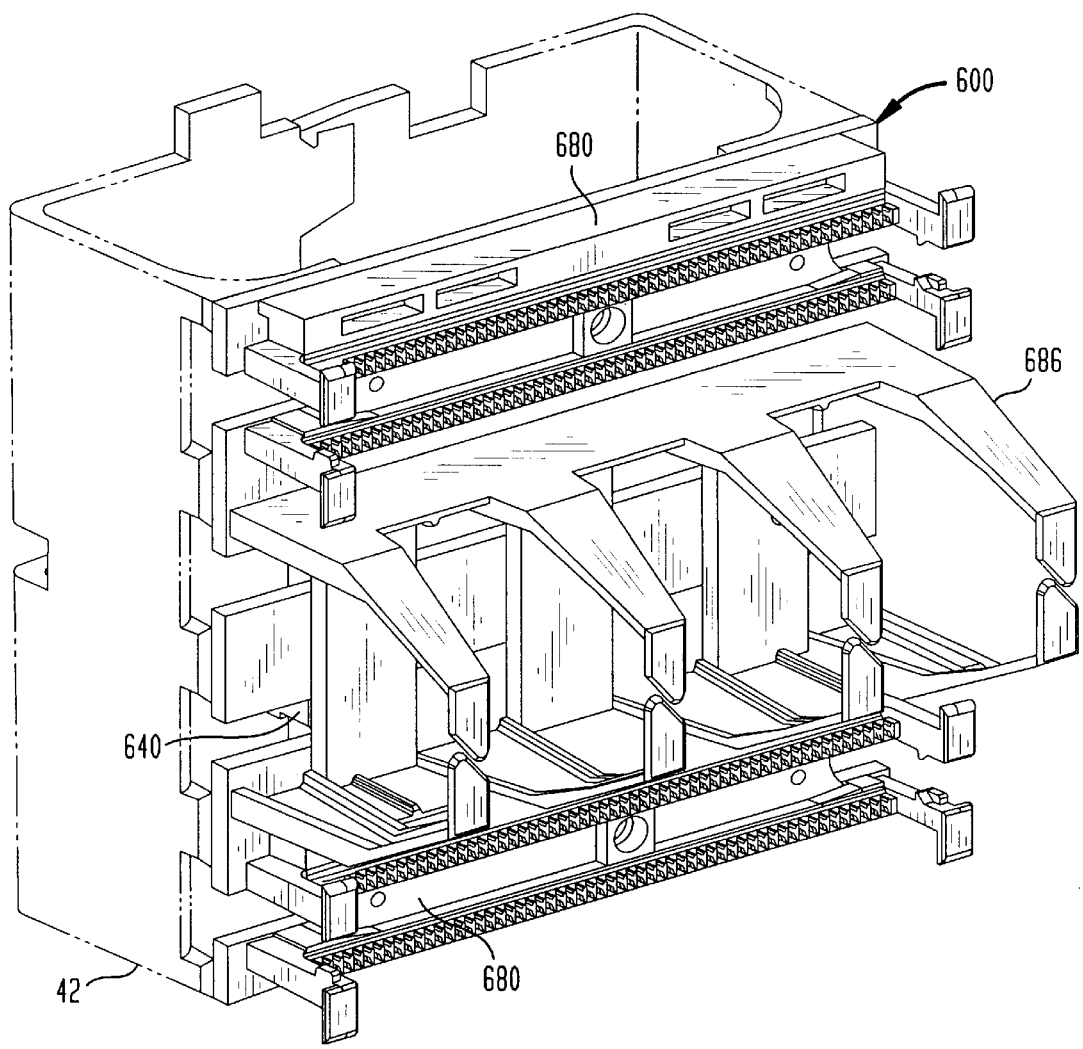
FIG. 17 is a perspective view of a sixth embodiment of the adapter plate having an integrally molded trough and integrally molded wiring blocks coupled to the adapter plate.

FIG. 17 illustrates a sixth embodiment of an adapter plate 600 of the invention. The adapter plate 600 includes a pair of integrally molded wiring blocks 680 and an integrally molded trough 686. The wiring blocks 680 are disposed on opposite sides of trough 686. Lower fasteners 640 attach the adapter plate 600 to the panel 40, and at least one pair of lower alignment pins (not shown) engage alignment holes in the arrowshaped tabs 48.

Figure 18:
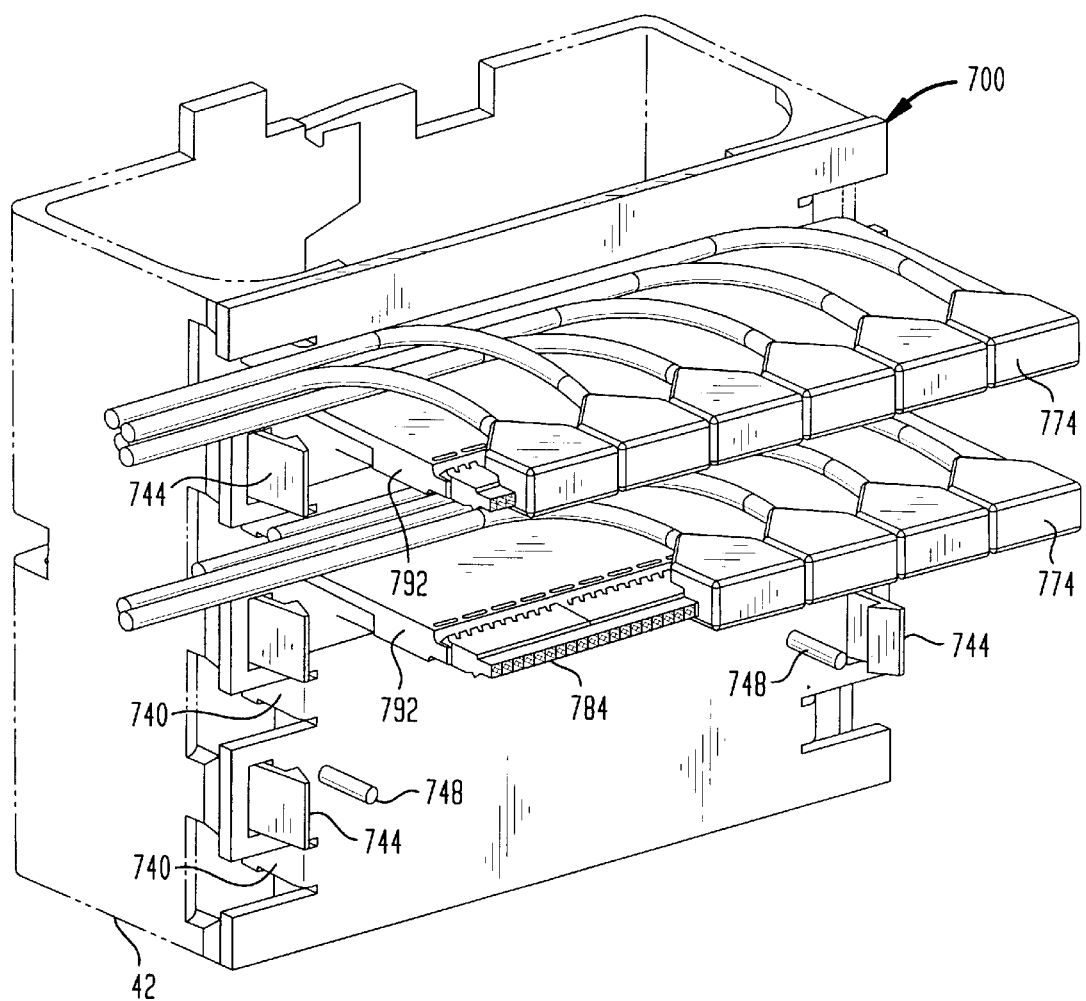
FIG. 18 is a perspective view of a configuration of a panel, a seventh embodiment of the adapter plate, and a pair of wiring standoffs configured to receive reverse patch cords.

FIG. 18 illustrates a seventh embodiment of an adapter plate 700 of the invention. The adapter plate 700 includes a plurality of lower fasteners 740 for retaining the adapter plate 700 on the panel 40, at least one pair of lower alignment pins (not shown) which fit into holes of tabs 48 of panel 40 for aligning the adapter plate 700 with the panel 40, a plurality of upper fasteners 744, and a plurality of upper alignment pins 748. The adapter plate 700 further includes a plurality of extended wiring standoffs 792 that hold the 110-type connector blocks 784 away from the adapter plate 700 to allow room for reverse patch cords 774 to engage the 110-type connector blocks 784. The extended wiring standoffs 792 and the reverse patch cords 774 are described in U.S. Pat. No. 5,718,604, the disclosure of which is incorporated herein by reference.

Figure 19:
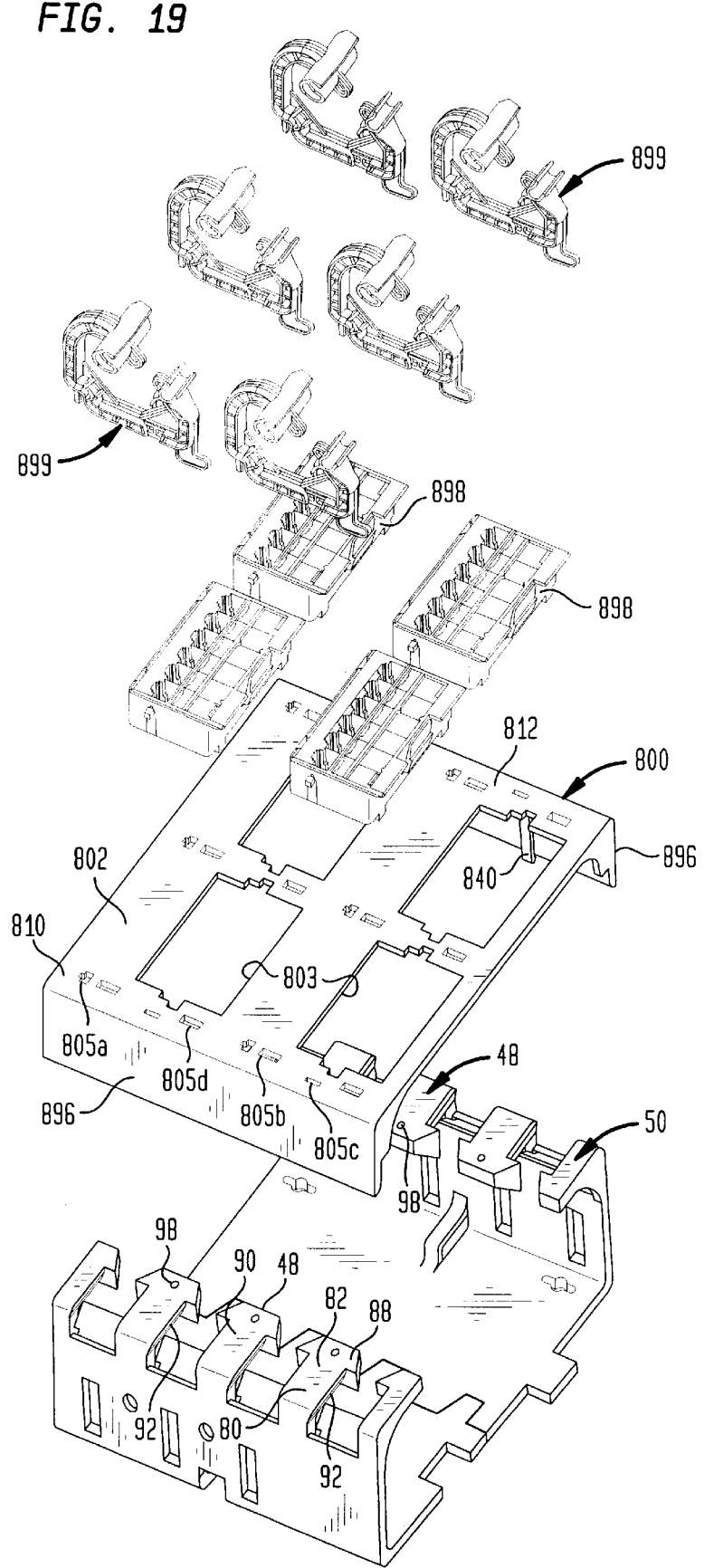
FIG. 19 is an exploded perspective view illustrating the relative positioning of a panel, an eighth embodiment of the adapter plate, and components of a cable patching system.
Figure 20:
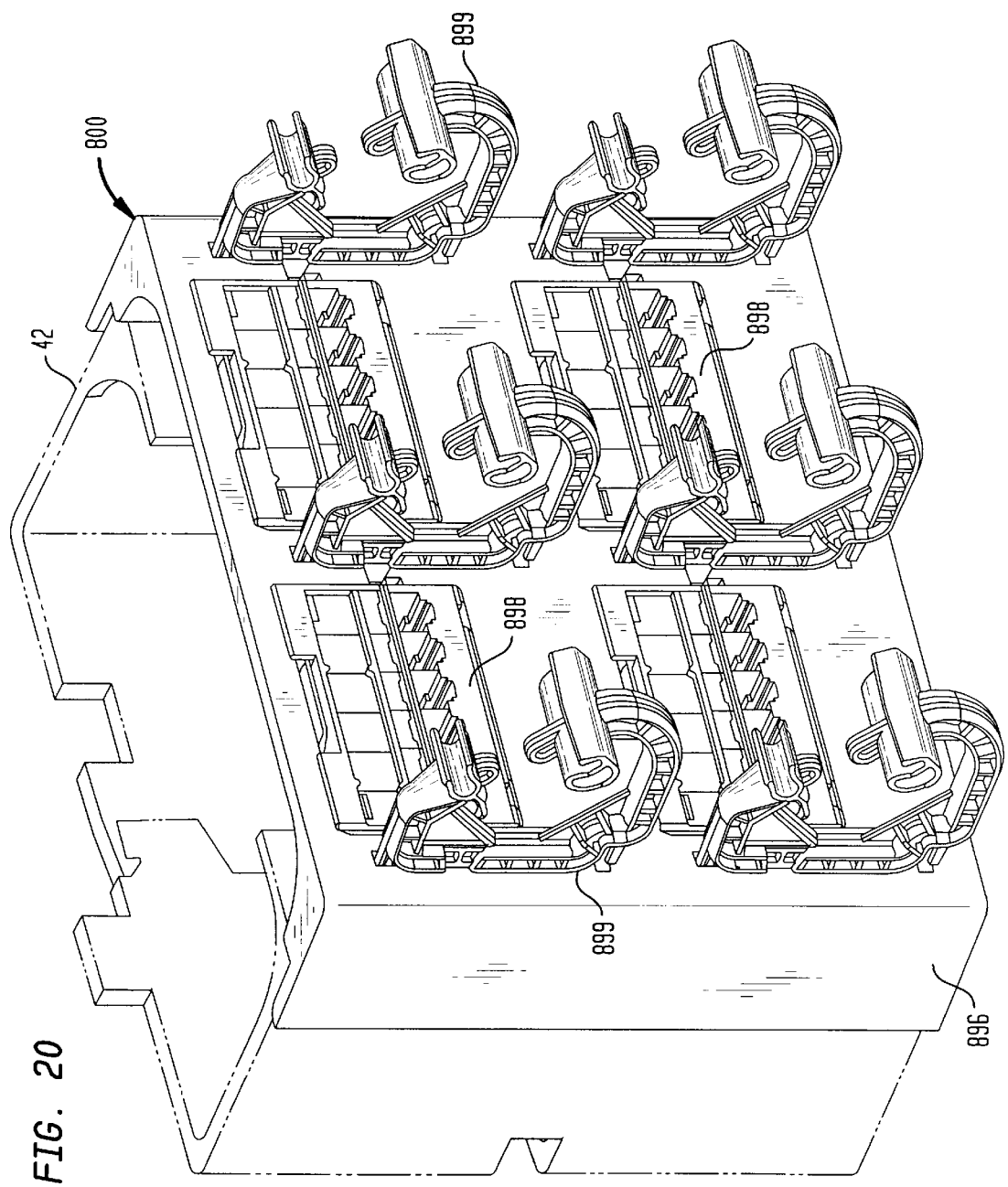
FIG. 20 is a perspective view illustrating the components of FIG. 19 as assembled.

FIGS. 19, 20 illustrates an eighth embodiment of an adapter plate 800 for use with a modular connector system, such as the PATCHMAX® system. An exemplary modular connector system is described in U.S. Pat. Nos. 5,639,261 and 5,700,167, the disclosures of which are incorporated herein by reference. The adapter plate 800 includes a plurality of lower fasteners 840 and a pair of abutment flanges 896 extending downwardly from the side edges 810, 812 to abut the arrow-shaped tabs 48. The base member 802 includes a plurality of rectangular apertures 803 configured to receive wiring blocks 898 and a plurality of apertures 805a, 805b, 805c, 805d for receiving retainer clips 899.

Although the invention has been illustrated and described with respect to a 110-type connector systems, it will be appreciated by those of ordinary skill in the art that the invention is equally applicable to other types of connection systems. Furthermore, the number and location of fasteners and alignment pins is not limited to that described and illustrated. For example, fasteners for retaining the adapter plate on the panel can be formed on the panel rather than the adapter plate.

The present invention provides multiple variations of interchangeable snap-on adapter plates that allow adaptation of a variety of different connectors and associated troughs to be mounted on cable panels, and any adapter plate configuration that accomplishes the purpose is acceptable. Many other modifications can be made to the invention and equivalent substitute for described and illustrated structures without departing from the spirit or scope of the invention. Accordingly, the scope of the present invention is not to be considered as limited by the specifics of the particular structure which have been described and illustrated, but is only limited by the scope of the appended claims.

What is claimed is:

1. A panel module for use in cable routing comprising: a base wall having a first alignment feature and a second alignment feature on a first panel segment , the first and second alignment features engaging a third alignment feature and a fourth alignment feature, respectively, on a second, identical panel segment to form a panel module, wherein the first and second alignment features of said first panel segment are configured to engage the third and fourth alignment features, respectively, of the second panel segment; and a fifth alignment feature on the firs panel segment, the fifth alignment feature being configured to engage a sixth alignment feature of a third panel segment.

2. The panel module of claim 1 wherein the fifth alignment feature includes a notch formed in one of a top or bottom, of the base wall and the sixth alignment feature on the third panel segment includes a tab, the notch on the fifth alignment feature being configured to receive the tab formed on the third panel segment to vertically align the first and third panel segments.

3. The panel module of claim 2 wherein the tab includes a rectangular tab and the notch includes a rectangular notch.

4. A panel module for use in cable routing comprising: a base wall having a first alignment feature and a second alignment feature on a first panel segment , the first and second alignment features engaging a third alignment feature and a fourth alignment feature, respectively, on a second, identical panel segment to form a panel module, wherein the first and second alignment features of said first panel segment are configured to engage the third and fourth alignment features, respectively, of the second panel segment; and a first coupler and a first receiver, the first coupler and the first receiver on the first panel segment being configured to engage a second receiver and a second coupler, respectively, of the second panel segment to join the first and second panel segments.

5. The panel module of claim 4 wherein the first coupler includes an arrow-shaped latch and the second receiver includes a recess configured to receive the latch to lock the first and second panel segments in a horizontal alignment.

6. The panel segment of claim 5 wherein the latch is formed on one of a top or bottom of the first coupler and the recess is formed on the other of a top or bottom of the second receiver.

7. A panel module for use in cable routing comprising: a base wall having a first alignment feature and a second alignment feature on a first panel segment, the first and second alignment features engaging a third alignment feature and a fourth alignment feature, respectively, on a second, identical panel segment to form a panel module; and a plurality of tabs extending from a sidewall of said first panel segment, wherein each of the plurality of tabs includes a proximal end attached to the sidewall and a distal end, and a trapezoidal shaped engaging portion attached to the distal end.

8. The panel module of claim 7 wherein the plurality of tabs includes a half tab formed at a top of the first panel segment and a half tab formed at a bottom of the panel segment, the half tabs of adjacent panel segments cooperating to define a whole tab.

9. The panel module of claim 7 wherein the tabs are disposed to engage an adapter plate.

10. A panel module for use in cable routing comprising: a base wall having a first alignment feature and a second alignment feature on a first panel segment, the first and second alignment features engaging a third alignment feature and a fourth alignment feature, respectively, on a second, identical panel segment to form a panel module, wherein the first alignment feature includes a projection extending from the base wall and in a plane of the base wall and the third alignment feature includes a recess formed in the base wall and in the plane of the base wall, the recess on the third alignment feature being complementary to the projection on the first panel segment to horizontally align the first and second alignment featurers.

11. The panel module of claim 10 wherein the projection includes a plurality of trapezoidal projections and the recess includes a plurality of trapezoidal recesses.

12. A cabling panel comprising:
at least one panel module forming a cabling channel, the at least one panel module comprising a plurality of interconnected panel segments, wherein the at least one panel module includes a first panel segment and a second panel segment and each of the first and second panel segments includes a coupler and a receiver, the coupler of the first panel segment being disposed to engage the receiver of the second panel segment to interconnect the first and second panel segments.

13. The panel of claim 12 wherein the first panel segment includes a first alignment feature and a second alignment feature, the second panel segment includes a third alignment feature and a fourth alignment feature, the first alignment feature of the first panel segment being disposed to engage the third alignment feature of the second panel segment to horizontally align the first and second panel segments.

14. The panel of claim 13 wherein the first alignment feature including a projection extending from a base wall and in a plane of the base wall and the third alignment feature includes a recess formed in a base wall of the second panel segment and in a plane of the base wall of the second panel segment, the recess on the third alignment feature being complementary to the projection on the first alignment feature to horizontally align the first and second panel segments.

15. The panel of claim 14 wherein the projection includes a plurality of trapezoidal projections and the recess includes a plurality of trapezoidal recesses.

16. The panel of claim 12 wherein the plurality of interconnected panel segments are identical.

17. A cabling panel comprising:
at least one panel module forming a cabling channel, the at least one panel module comprising a plurality of interconnected panel segments, wherein the at least one panel module includes a first panel segment and a second panel segment and a spacer disposed between the first and second panel segments, and wherein the first panel segment includes a first alignment feature and a second alignment features the second panel segment includes a third alignment feature and a fourth alignment feature, and the spacer includes a first side and a second side, said first side including a fifth alignment feature and a sixth alignment feature, said second side including a seventh alignment feature and an eighth alignment feature, the fifth alignment feature on the first side of the spacer engaging the second alignment feature on the first panel segment, the sixth alignment feature on the first side engaging the first alignment feature formed on the first panel segment, the seventh alignment feature on the second side engaging the third alignment feature formed on the second panel segment, and the eighth alignment feature on the second side engaging the fourth alignment feature on the second panel segment.

18. A cabling panel comprising:
at least one panel module forming a cabling channel, the at least one panel module comprising a plurality of interconnected panel segments, wherein each of said panel segments further includes a base wall, a first alignment feature and a second alignment feature, wherein the first alignment feature includes a notch formed in one of the top or bottom of the base wall and the second alignment feature includes a tab formed in the other of the top or bottom of the base wall, the notch on a first panel segment being configured to receive the tab formed on a third panel segment to vertically align the first and third panel segments.

19. The panel of claim 18 wherein the third alignment feature includes a rectangular notch and the fourth alignment feature includes a complementary rectangular tab.

20. A cabling panel comprising:
at least one panel module forming a cabling channel, the at least one panel module comprising a plurality of interconnected panel segments, wherein each of said panel segments further includes a base wall, a coupler and a receiver, the coupler including an arrow-shaped latch and the receiver including a recess configured to receive the latch to lock a first panel segment and a second panel segment of said panel segments in a horizontal alignment.

21. The panel of claim 20 wherein the plurality of interconnected panel segments includes a first module and a second module disposed adjacent each other, the first module including a first alignment feature disposed to engage a second alignment feature of the second module to align the modules.

22. The panel of claim 20 wherein the latch is formed on one of the top or bottom of the base wall and the recess is formed on the other of the top or bottom of the base wall.

23. A cabling panel comprising:
at least one panel module forming a cabling channel, the at least one panel module comprising a plurality of interconnected panel segments, wherein the at least one panel module includes a first module and a second module, the first module longer than the second module.

24. The panel of claim 23 wherein the first module is about three times longer than the second module.

25. A cabling system comprising:
a panel having a plurality of panel segments interconnected to form a panel module, each of said panel segments including a plurality of alignment features interconnected with said panel segments;
an adapter plate coupled to the panel; and
at least one cabling component coupled to the adapter plate.

26. The system of claim 25 further comprising a plurality of fasteners for coupling the adapter plate to the panel and the cabling component to the adapter plate.

27. The system of claim 26 wherein the adapter plate includes a first surface and a second surface and the plurality of fasteners includes a first plurality of fasteners attached to the first surface for engaging the panel and a second plurality of fasteners attached to the second surface for engaging the cabling component.

28. The system of claim 25 wherein the cabling component includes a wiring block and a trough.

29. The system of claim 25 further comprising a first plurality of alignment pins attached to one of the panel and the adapter plate, the first plurality of alignment pins being disposed to align the panel and the adapter plate, and a second plurality of pins attached to one of the adapter plate and the cabling component, the second plurality of alignment pins being disposed to align the adapter plate and the cabling component.

30. The system of claim 29, wherein the first and second pluralities of alignment pins are attached to the adapter plate.

31. The system of claim 29, wherein the first and second pluralities of fasteners are attached to the adapter plate.

32. The system of claim 25 further comprising a wiring block integrally formed on the adapter plate.

33. The system of claim 25 wherein the adapter plate includes a planar plate like body, at least one first fastener extending from said planar plate like body in a first direction and configured to engage with and be secured to the panel, and at least one second fastener extending from said planar plate like body in a second direction, opposite said first direction, and configured to engage with and be secured to the cabling component.

34. The system of claim 25 wherein the adapter plate further comprises an abutment portion adapted to abut a support panel and cooperate with a first plurality of fasteners to position the adapter plate at least partly away from the support panel.

35. The system of claim 34 wherein the abutment portion includes a flange depending from an edge of the adapter plate adapted to orient the adapter plate at an angle relative to the support panel.

36. The system of claim 34 wherein the abutment portion includes a pair of flanges depending from opposite edges of the adapter plate, the flanges being sized to space the adapter plate away from the support panel.

37. The system of claim 25 wherein the adapter plate further comprises an integral wiring block extending from a surface of the adapter plate.

38. The system of claim 37 wherein the wiring block includes an extended wiring standoff adapted to engage with a reverse patch cord.

39. The system of claim 37 wherein the wiring block includes a pair of wiring blocks, with a trough being disposed between the pair of wiring blocks.

* * * * *